Figure 1:
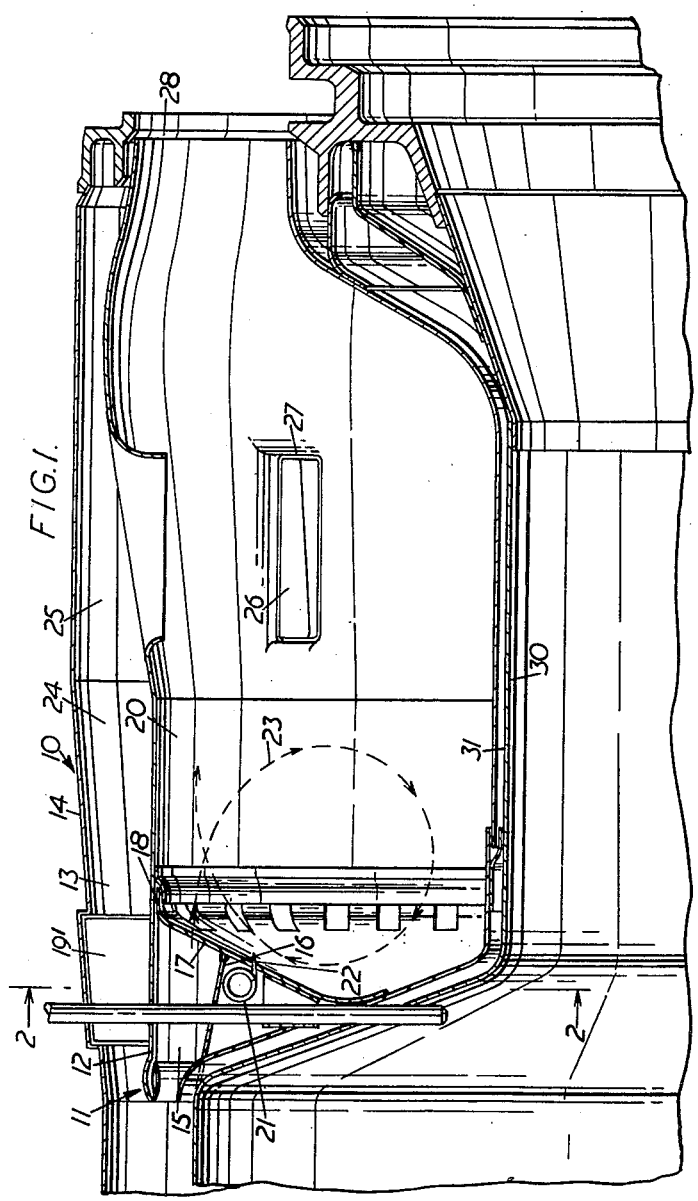

March 12, 1963 A. H. LEFEBVRE 3,080,715
COMBUSTION CHAMBER
Filed Feb. 26, 1960 2 Sheets-Sheet 1

Arthur Henry Lefebvre
Inventor

By
Fred L. Witherspoon, Jr. &
Fred E. Shoemaker Attorneys

March 12, 1963 A. H. LEFEBVRE 3,080,715
COMBUSTION CHAMBER
Filed Feb. 26, 1960 2 Sheets-Sheet 2

United States Patent Office 3,080,715
Patented Mar. 12, 1963

3,080,715
COMBUSTION CHAMBER
Arthur Henry Lefebvre, Mackworth, England, assignor to Rolls-Royce Limited, Derby, Derbyshire, England, a company of Great Britain
Filed Feb. 26, 1960, Ser. No. 11,294
Claims priority, application Great Britain Apr. 28, 1959
4 Claims. (Cl. 60—39.65)

This invention concerns combustion chambers e.g. for use in a gas turbine engine.

Combustion chambers are known whose air supply is divided into "primary," "secondary," and "tertiary" portions. The "primary" air is introduced into the combustion chamber upstream of the combustion zone therein and provides at least the greater part of the air required to support combustion. The "secondary" air is introduced into the combustion chamber downstream of the combustion zone to assist the combustion gases to undergo reversals of direction and to complete the combustion. The "tertiary" air (also known as "dilution" air) is introduced into the combustion chamber downstream of the "secondary" air so as to mix with the combustion gases and reduce their temperature to a value acceptable to the turbine of the engine.

The object of the present invention is to provide a simplified construction of combustion chamber which enables the length of the combustion chamber to be reduced.

According to the present invention there is provided a combustion chamber comprising a combustion compartment, a primary air duct for supplying primary air to a combustion zone in said combustion compartment, means for providing at least one sheltered area within the combustion zone, and a dilution air duct extending adjacent said combustion compartment and communicating with the latter downstream of the combustion zone, said dilution air duct being formed to diffuse the dilution air prior to its introduction into the combustion compartment.

The primary air duct may, if desired, diverge in a downstream direction so as to effect diffusion of the primary air.

Preferably, the means for providing at least one sheltered area within the combustion zone comprises an apertured member mounted in the primary air duct and having spaced apart apertures for the flow therethrough of the primary air, the parts of said apertured member between the apertures providing sheltered areas within the combustion zone.

Thus the apertured member may be provided with a plurality of equi-spaced peripheral apertures and may be mounted at or adjacent the downstream end of the primary air duct.

The combustion chamber may be provided with a partition which divides the combustion compartment from the dilution air duct, there being openings in the partition which are bounded by walls which extend into the combustion compartment and which assist deflection of the dilution air from the dilution air duct and into the combustion compartment.

The dilution air duct may bound one peripheral surface only (say the outer peripheral surface) of the combustion compartment, the other peripheral surface (say the inner peripheral surface) being bounded by a duct arranged to be supplied with cooling air from the said inlet portion of the combustion chamber.

Figure 2:
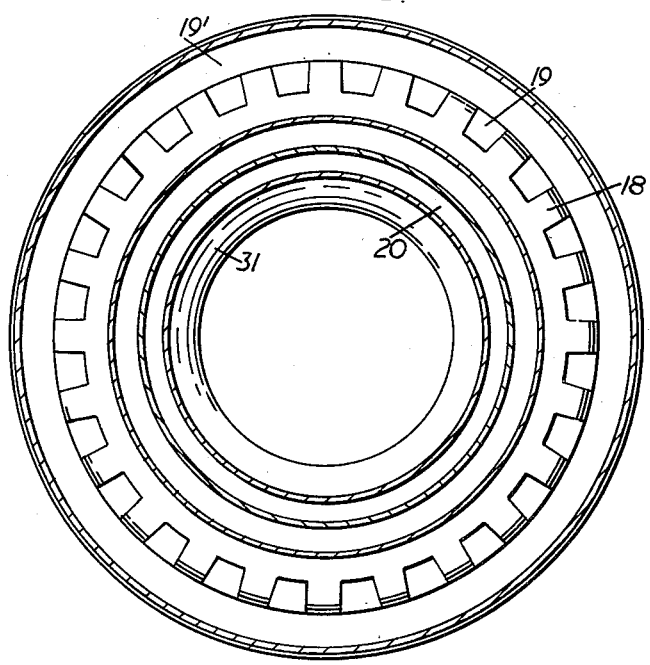

The invention is illustrated, merely by way of example in the accompanying drawings in which:

FIGURE 1 is a longitudinal section through part of a combustion chamber according to the present invention, and FIGURE 2 is a section taken on the line 2—2 of FIGURE 1.

Referring to the drawings, a combustion chamber 10 of a gas turbine engine is of annular form and is provided with an annular inlet portion 11 which receives compressed air from the compressor (not shown) of the engine.

The inlet portion 11 is divided by a tubular partition 12 into an outer (or "dilution air") duct 13, which is arranged between the partition 12 and the engine casing 14, and an inner (or "primary air") duct 15 which is arranged between the partition 12 and a wall 16. As will be seen from FIGURE 1, the primary air duct 15 diverges in a downstream direction. The duct 15 therefore acts as a diffuser for the primary air flowing therethrough.

The downstream end of the duct 15 is blocked by an annular wall member 17 which is formed with a plurality (e.g. 24) of equi-spaced peripheral teeth 18 which define between themselves apertures 19. The wall member 17 forms part of the boundary wall of a combustion compartment 20.

Vanes 19' in the dilution air duct 13 are provided to straighten the flow of dilution air passing through the duct 13.

Mounted inwardly of the wall 16 is a fuel manifold 21 through which fuel is delivered to a plurality of fuel injection nozzles 22 extending into the combustion compartment 20. Means (not shown) are provided for igniting the combustible mixture. The combustion gases so produced undergo a single reversal of direction as indicated by the dotted line 23.

The dilution air duct 13 and partition 12 extend throughout the length of the combustion chamber. The dilution air duct 13 has an upstream divergent portion 24 and a downstream convergent portion 25. The part of the partition 12 which bounds the convergent portion 25 is provided with a plurality (e.g. 18) of slots 26. Each of the slots 26 is bounded by walls 27 which serve to deflect or "scoop" the dilution air flowing through the duct 13 into the slots 26 and so into the combustion compartment 20. This air mixes with, so as to dilute, the products of combustion. The purpose of the dilution air is to reduce the temperature of the products of combustion to a value acceptable to the turbine of the engine, the said products of combustion being discharged to the turbine through an annular outlet end 28 of the combustion chamber.

The dilution air flowing through the duct 13 also serves to cool the engine casing 14. In order to cool the inner wall 30 of the combustion chamber there is provided a cooling duct 31 which is arranged to be supplied with cooling air from the inlet portion 11.

The partition 12 may be so disposed that about 55% of the air flowing through the inlet portion 11 passes into the dilution air duct 13. Of the remaining 45%, about 40% may be arranged to pass into the primary air duct 15 and about 5% into the cooling duct 31.

The combustion chamber of this invention is based upon an appreciation that the primary air need not be diffused. It can be put straight into the combustion chamber provided it is put in through apertures between teeth, which provide blockages or sheltered areas within the combustion zone.

The tertiary air or dilution air does need diffusing, but the diffusion takes place between the entry to the combustion chamber and the slots 26. Thus use is made of the length of the combustion chamber itself to provide diffusion, and this permits an overall reduction in the combustion chamber length, since no additional diffuser is required at the upstream end of the combustion chamber. The dilution air is to be diffused so that it is at a sufficiently low velocity to enter the chamber through the slots 26.

In the particular arrangement shown, the primary air also is subject to a degree of diffusion in the primary air duct 15 although this diffusion is not essential.

The apertures 19 between teeth 18 allow the primary air to enter, but afford sheltered areas corresponding to each of the teeth and also provide mixing zones along the length of the teeth.

The teeth also provide a path for the recirculation of combustion products during the single reversal which takes place.

Thus with the single side entry of primary and dilution air and with only a nominal amount of air for cooling the inner flame tube, there is an appreciable reduction in the overall length of the combustion system as the diffusion length normally required at the upstream end of the chamber is eliminated.

In the combustion chamber shown in the drawings no secondary air is used and the gases undergo a single reversal in the combustion zone of the combustion chamber.

I claim:

1. An elongated combustion chamber having a longitudinal axis and comprising a combustion compartment, having an upstream inlet end and a downstream outlet end, a member mounted at the upstream end of the combustion compartment to substantially close the same, said member being formed to define a plurality of equi-spaced, peripheral, axial-flow apertures in the member, the remainder of said member being unapertured and providing a sheltered zone downstream thereof, fuel injection means axially directed into only said shelter zone, an air duct for supplying all the combustion air through said axial flow apertures only to the sheltered zone, the radial length of said axial flow apertures being small in relation to the radial length of the whole sheltered zone whereby the combustion gases undergo a single reversal of direction in said sheltered zone, and a dilution air duct communicating with the combustion compartment downstream of the sheltered zone and the fuel injector means, said dilution air duct being constructed to diffuse the dilution air substantially within the length of the combustion compartment and prior to its introduction into the combustion compartment.

2. An elongated combustion chamber having a longitudinal axis and comprising a combustion compartment, having an upstream inlet end and a downstream outlet end, a member mounted at the upstream end of the combustion compartment to substantially close the same, said member being formed to define a plurality of spaced apart, peripherally disposed, axial-flow apertures in the member, the remainder of said member being unapertured and providing a sheltered zone downstream thereof, means to direct fuel axially within said shelter zone only, an air duct for supplying all the combustion air through said axial flow apertures only to the sheltered zone, said air duct diverging in a downstream direction and diffusing the combustion air, the radial length of said axial flow apertures being small in relation to the radial length of the whole sheltered zone whereby the combustion gases undergo a single reversal of direction in said sheltered zone, a dilution air duct communicating with the combustion compartment downstream of the sheltered zone and the fuel injection means, said dilution air duct being constructed to diffuse the dilution air prior to its introduction into the combustion compartment, and straightening vanes within said dilution air duct, straightening the dilution air.

3. An annular, elongated combustion chamber having a longitudinal axis of symmetry and comprising an annular combustion compartment having an upstream inlet and a downstream outlet end, a member mounted at and substantially transversely of the upstream end of the combustion compartment to substantially close same, said member being formed to define a plurality of spaced apart, peripherally disposed, axial-flow apertures in the member, the remainder of said member being unapertured and providing a sheltered zone downstream thereof, fuel injection means axially directed into only said sheltered zone, an air duct for supplying all the combustion air through said axial flow apertures only to the sheltered zone, the radial length of said axial flow apertures being small in relation to the radial length of the whole sheltered zone whereby the combustion gases resulting from the said air and fuel burning together undergo a single reversal of direction in said sheltered zone, a dilution air duct bounding one peripheral surfact of said combustion compartment, straightening vanes within said dilution air duct straightening the dilution air, means forming passages from said dilution air duct communicating with the combustion compartment downstream of the sheltered zone and the fuel injector means, and a cooling air duct bounding the other peripheral surface of the combustion compartment.

4. An elongated combustion chamber having a longitudinal axis and comprising a combustion compartment having an upstream inlet end and a downstream outlet end, a member mounted at and substantially transversely of the upstream end of the combustion compartment to substantially close the same, said member being formed to define a plurality of spaced apart, peripherally disposed axial flow apertures in the member, the remainder of said member being unapertured and providing a sheltered zone downstream thereof, fuel injection means axially directed into only said sheltered zone, an air duct for supplying all the combustion air to the sheltered zone through said axial flow apertures only, the radial length of said axial flow apertures being small in relation to the radial length of the whole sheltered zone whereby the combustion gases undergo a single reversal of direction in said sheltered zone, a diverging-converging dilution air duct extending alongside the combustion compartment, straightening vanes within said dilution air duct for straightening the dilution air, a partition separating the combustion compartment and the dilution air duct, said partition having formed therein apertures, and walls bounding said apertures and extending into the combustion compartment downstream of the combustion zone to assist in deflecting the dilution air from the dilution air duct into the combustion compartment.

References Cited in the file of this patent

UNITED STATES PATENTS

| 2,687,010 | Ellis | Aug. 24, 1954 |
| 2,901,032 | Brola | Aug. 25, 1959 |
| 2,930,193 | Jaramillo | Mar. 29, 1960 |
| 2,977,760 | Soltau | Apr. 4, 1961 |
| 2,999,359 | Murray | Sept. 12, 1961 |

FOREIGN PATENTS

| 666,062 | Great Britain | July 19, 1948 |
| 809,514 | Great Britain | Feb. 25, 1959 |